US012715114B2

(12) United States Patent
Bächer et al.

(10) Patent No.: US 12,715,114 B2
(45) Date of Patent: Aug. 25, 2026

(54) VERSATILE MOTION PRIORS FOR ARTIST-DIRECTABLE PHYSICAL CHARACTERS

(71) Applicants: DISNEY ENTERPRISES, INC., Burbank, CA (US); ETH Zürich, Zürich (CH)

(72) Inventors: Moritz Niklaus Bächer, Zürich (CH); Agon Serifi, Zürich (CH); Ruben Jelle Grandia, Zürich (CH); Lars Espen Knoop, Birmensdorf (CH)

(73) Assignee: Disney Enterprises, Inc., Burbank, CA (US)

( * ) Notice: Subject to any disclaimer, the term of this patent is extended or adjusted under 35 U.S.C. 154(b) by 134 days.

(21) Appl. No.: 18/660,540

(22) Filed: May 10, 2024

(65) Prior Publication Data

US 2024/0391094 A1 Nov. 28, 2024

Related U.S. Application Data

(60) Provisional application No. 63/503,895, filed on May 23, 2023.

(51) Int. Cl.
*B25J 9/16* (2006.01)

(52) U.S. Cl.
CPC ............... *B25J 9/161* (2013.01); *B25J 9/163* (2013.01); *B25J 9/1664* (2013.01)

(58) Field of Classification Search
CPC ........... B25J 9/161; B25J 9/163; B25J 9/1664
USPC ................. 700/245-264; 318/568.11-568.25
See application file for complete search history.

(56) References Cited

U.S. PATENT DOCUMENTS

| | | | | |
|---|---|---|---|---|
| 9,129,158 | B1 * | 9/2015 | Medasani | G06V 40/20 |
| 11,403,513 | B2 * | 8/2022 | Hasenclever | G06N 3/0455 |
| 11,478,927 | B1 * | 10/2022 | Kranski | B25J 9/161 |
| 11,524,401 | B1 * | 12/2022 | Zhang | G06N 3/008 |
| 11,691,278 | B2 * | 7/2023 | Kranski | B25J 13/086 700/245 |
| 11,904,467 | B2 * | 2/2024 | Hafner | B25J 9/1661 |
| 2020/0104685 | A1 * | 4/2020 | Hasenclever | G06N 3/096 |
| 2021/0205984 | A1 * | 7/2021 | Hafner | G06N 7/01 |
| 2021/0312689 | A1 * | 10/2021 | Akhoundi | G06N 3/047 |
| 2022/0198732 | A1 * | 6/2022 | Lin | G06T 7/74 |
| 2022/0207831 | A1 * | 6/2022 | Saragih | G06T 7/73 |
| 2022/0314434 | A1 * | 10/2022 | Kranski | B25J 9/163 |
| 2022/0318678 | A1 * | 10/2022 | Kranski | G06N 20/00 |
| 2023/0095351 | A1 * | 3/2023 | Luo | G06N 20/00 706/12 |

(Continued)

OTHER PUBLICATIONS

Mourot et al, "A Survey on Deep Learning for Skeleton-Based Human Animation"; 2022, EG Euro Graphics—Computer Graphics forum; vol. 41, No. 1, pp. 122-157; DOI: 10.1111/cgf.14426 (Year: 2022).*

(Continued)

*Primary Examiner* — Jaime Figueroa
(74) *Attorney, Agent, or Firm* — Dorsey & Whitney LLP

(57) ABSTRACT

An encoder is trained to generate latent representations of kinematic motion from motion data and a control policy is trained to generate dynamics informed output for a robotic system based on the latent representations of kinematic motion. The encoder and the control policy are deployed in the robotic system to generate the dynamics informed output based on the motion data.

20 Claims, 5 Drawing Sheets

(56) References Cited

U.S. PATENT DOCUMENTS

2023/0126906 A1* 4/2023 Kranski .................. B25J 9/161
700/245
2024/0095986 A1* 3/2024 Juravsky ................ G06V 10/82

OTHER PUBLICATIONS

Zhang et al;. "Videogpt: Video generation using vq-vae and transformers". arXiv preprint arXiv:2104.10157. Apr. 20, 2021. (Year: 2021).*
ActorCore, Girl dance 3D motions, 2023, 1 page.
Reallusion, 3D character production and 2D cartoon animals, 2024, 5 pages.
Ba, Jimmy L.et al., Layer Normalization, arXiv:1607.06450 [stat. ML], 2016, 14 pages.
Bergamin, K. et al., DReCon: Data-Driven Responsive Control of Physics-Based Characters, ACM Trans. Graph., Article 206 (Nov. 2019), 38 (6):11 pages.
Bommasani, R., et al.,On the opportunities and risks of foundation models, arXiv preprint arXiv:2108.07258, 2022, 214 pages.
Chandran, P. et al., Facial Animation with Disentangled Identity and Motion using Transformers, Computer Graphics Forum, 2022, vol. 41(8): 267-277.
Clevert, D. et al., Fast and Accurate Deep Network Learning by Exponential Linear Units (ELUs), arXiv:1511.07289 [cs.LG], 2016, 14 pages.
Dhariwal, P. et al., Jukebox: A Generative Model for Music, 2020, arXiv:2005.00341 [eess.AS], 20 pages.
Dou, Z. et al., C•ASE: Learning Conditional Adversarial Skill Embeddings for Physics-Based Characters, In SIGGRAPH Asia 2023 Conference Papers, Association for Computing Machinery, New York, NY, USA, 2023, Article 2: 11 pages.
Feng, Y. et al., MuscleVAE: Model-Based Controllers of Muscle-Actuated Characters, In SIGGRAPH Asia 2023 Conference Papers (Sydney, NSW, Australia), Association for Computing Machinery, New York, NY, USA, 2023, Article 3:11 pages.
Fu, H. et al., Cyclical Annealing Schedule: A Simple Approach to Mitigating KL Vanishing, Proceedings of the NAACL-HLT, 2019, vol. 1: 240-250.
Fussell, L. et al., SuperTrack: Motion tracking for physically simulated characters using supervised learning, ACM Trans.Graph., 2021, vol. 40 (6): 1-13.
Gehring, J. et al., Leveraging Demonstrations with Latent Space Priors, Transactions on Machine Learning Research, 2023, 26 pages.
Grandia, R. et al., DOC: Differentiable Optimal Control for Retargeting Motions onto Legged Robots, ACM Trans.Graph., Jul. 2023, vol. 42(4): 14 pages.
Harvey, F. et al., Robust Motion In-Betweening, ACM Trans. Graph., Aug. 2020, vol. 39(4): 12 pages.
Hasenclever, L. et al., CoMic: Complementary Task Learning & Mimicry for Reusable Skills, Proceedings of the 37th International Conference on Machine Learning, 2020, PMLR 119: 4105-4115.
Higgens, I. et al., Beta-vae: Learning basic visual concepts with a constrained variational framework, International conference on learning representations, 2017, 22 pages.
Hwangbo, J. et al., Learning agile and dynamic motor skills for legged robots, Science Robotics, aau5872, 2019, vol. 4(26): 20 pages.
Juravsky, J. et al.,PADL: Language—Directed Physics-Based Character Control, SIGGRAPH Asia 2022 Conference Papers, Association for Computing Machinery, New York, NY, USA, 2022 Article 19, 9 pages.
Kingma, D. and Welling, M., Auto-encoding variational bayes, arXiv preprint arXiv:1312.6114, 2013, 14 pages.
Lee, Y. et al., Data-Driven Biped Control, ACM SIGGRAPH 2010 Papers (Los Angeles, California) (SIGGRAPH '10), Association for Computing Machinery, New York, NY, USA, 2010, Article 129, 8 pages.
Lee, S. et al., SAME: Skeleton-Agnostic Motion Embedding for Character Animation, SIGGRAPH Asia 2023 Conference Papers, Association for Computing Machinery, New York, NY, USA, 2023, Article 45, 11 pages.
Levine, S. et al., Continuous Character Control with Low-Dimensional Embeddings, ACM Trans. Graph. 31, 4, Article 28, 2012, 10 pages.
Ling, H. et al., Character Controllers Using Motion VAEs, ACM Trans.Graph., vol. 39 (4), Article 40, 2020 12 pages.
Liu, L. et al., On the Variance of the Adaptive Learning Rate and Beyond, In Proceedings of the Eighth International Conference on Learning Representations, ICLR 2020, 14 pages.
Liu and Hodgins, Learning to Schedule Control Fragments for Physics-Based Characters Using Deep Q-Learning, ACM Trans. Graph., 2017, vol. 36(3): 14 pages.
Loshchilov, I. and Hutter, F, SGDR: Stochastic gradient descent with warm restarts, arXiv preprint arXiv:1608.03983, 2016, 16 pages.
Luo et al., CARL: controllable agent with reinforcement learning for quadruped locomotion, ACM Trans. Graph., 2020, vol. 39 (4): 38:1-38:10.
Luo, Z. et al., Perpetual Humanoid Control for Real-time Simulated Avatars, International Conference on Computer Vision (ICCV), 2023, 10 pages.
Makoviychuk, V. et al., Isaac gym: High performance gpu-based physics simulation for robot learning, arXiv preprint arXiv:2108.10470, 2021, 32 pages.
Merel, J. et al., Neural probabilistic motor primitives for humanoid control, arXiv:1811.11711 [cs.LG], 2018, 14 pages.
Merel, J. et al., Catch & Carry: reusable neural controllers for vision-guided whole-body tasks, ACM Trans. Graph., 2020, vol. 39(4): 39:1-39:12.
Mixamo, Animated 3D characters for games, film and more, 2023, 7 pages.
Park, S. et al., Learning predict-and-simulate policies from unorganized human motion data, ACM Trans. Graph. 38, 6, 2019, 11 pages.
Peng, X. et al., Deepmimic: Example-guided deep reinforcement learning of physics-based character skills, ACM Transactions On Graphics (TOG), 2018 vol. 37(4): 18 pages.
Peng, X. et al., Sim-to-real transfer of robotic control with dynamics randomization, 2018 IEEE international conference on robotics and automation (ICRA). IEEE, 2018, 3803-3810.
Peng, et al., AMP: adversarial motion priors for stylized physics-based character control, ACM Trans.Graph., 2021, vol. 40(4): 20 pages.
Peng, et al., ASE: Large-Scale Reusable Adversarial Skill Embeddings for Physically Simulated Characters, ACM Trans. Graph., 2022, vol. 41(4): 18 pages.
Raab, et al., Single Motion Diffusion, arXiv:2302.05905 [cs.CV], 2023, 14 pages.
Raab, S., et al., Modi: Unconditional motion synthesis from diverse data, Proceedings of the IEEE/CVF Conference on Computer Vision and Pattern Recognition (CVPR), 2023, pp. 13873-13883.
Radford, A., et al., Learning Transferable Visual Models From Natural Language Supervision, Proceedings of the 38th International Conference on Machine Learning (Proceedings of Machine Learning Research, vol. 139), PMLR, 2021,16 pages.
Rempe, D. et al., HuMoR: 3D Human Motion Model for Robust Pose Estimation, International Conference on Computer Vision (ICCV), 2021, 25 pages.
Schulman, J. et al., Proximal policy optimization algorithms, arXiv preprint arXiv:1707.06347, 2017, 12 pages.
Schumacher, C. et al., A Versatile Inverse Kinematics Formulation for Retargeting Motions Onto Robots With Kinematic Loops, IEEE Robotics and Automation Letters 6, 2 (2021), 943-950.
Shafir, Y. et al., Human motion diffusion as a generative prior, arXiv preprint arXiv:2303.01418, 2023, 10 pages.
Sok, K. et al., Simulating biped behaviors from human motion data, ACM SIGGRAPH 2007 papers, 9 pages.
Starke, S. et al., Local Motion Phases for Learning Multi-Contact Character Movements, ACM Trans.Graph., 2020, Article 54, vol. 39(4): 14 pages.

(56) References Cited

OTHER PUBLICATIONS

Starke, S. et al., DeepPhase: periodic autoencoders for learning motion phase manifolds, ACM Trans. Graph., 2022, vol. 41 (4): 1-13.
Tessler, C. et al., CALM: Conditional Adversarial Latent Models for Directable Virtual Characters, ACM SIGGRAPH 2023 Conference Proceedings (Los Angeles, CA, USA) (SIGGRAPH '23). Association for Computing Machinery, New York, NY, USA, 2023, 9 pages.
Tevet, G. et al., Motionclip: Exposing human motion generation to clip space, Computer Vision—ECCV 2022: 17th European Conference, Tel Aviv, Israel, Oct. 23-27, 2022, Proceedings, Part XXII. Springer, pp. 358-374.
Tevet, G. et al., Human Motion Diffusion Model, The Eleventh International Conference on Learning Representation, 2023, 16 pages.
Wampler, K. et al., Generalizing locomotion style to new animals with inverse optimal regression, ACM Transactions on Graphics (TOG), 2014, vol. 33(4): 11 pages.
Wang, T. et al., UniCon: Universal Neural Controller For Physics-based Character Motion, arXiv:2011.15119 [cs.GR], 2020, 15 pages.
Won, J. et al., A scalable approach to control diverse behaviors for physically simulated characters, ACM Trans. Graph., 2020, vol. 39(4): 33:1-33:12.
Won, J. et al., Physics-based character controllers using conditional VAEs, ACM Trans.Graph., 2022, vol. 41(4): pp. 1-12.
Xu, P. et al., Composite Motion Learning with Task Control, ACM Transactions on Graphics, 2023, vol. 42(4): 16 pages.
Yao, H. et al., ControlVAE: Model-Based Learning of Generative Controllers for Physics-Based Characters, ACM Trans.Graph., 2022, vol. 41 (6): 1-16.
Yuan, Y. et al., PhysDiff: Physics-Guided Human Motion Diffusion Model, Proceedings of the IEEE/CVF International Conference on Computer Vision (ICCV), 2023, 13 pages.
Zhao, W., Sim-to-real transfer in deep reinforcement learning for robotics: a survey, In 2020 IEEE symposium series on computational intelligence (SSCI), IEEE, 2020, pp. 737-744.
Zhou, Y. et al., On the continuity of rotation representations in neural networks, Proceedings of the IEEE/CVF Conference on Computer Vision and Pattern Recognition, 2019, pp. 5745-5753.
Zhu, Q. et al., Neural Categorical Priors for Physics-Based Character Control, ACM Trans Graph, vol. 42 No. 6, Article 178, 2023, 16 pages.

* cited by examiner

VERSATILE MOTION PRIORS FOR ARTIST-DIRECTABLE PHYSICAL CHARACTERS

CROSS-REFERENCE TO RELATED APPLICATIONS

This application claims the benefit of priority to U.S. Provisional Application No. 63/503,895, entitled "Versatile Motion Priors for Artist-Directable Physics-Based Characters," filed May 23, 2023, the disclosure of which is hereby incorporated herein for all purposes.

FIELD

The present application relates to systems and methods of generating physics-based or robotic characters based on artist input.

BACKGROUND

Conventional animation techniques may be difficult to apply to robotics, as animated characters do not always follow the laws of physics. Physical robots, in contrast, must observe the laws of physics to remain dynamically stable. However, it is often desirable (e.g., where autonomous robots are provided for specific characters) to utilize animation techniques to imitate the style of a particular character, such as the gait and movement characteristics of the character while performing tasks such as everyday tasks, athletic motions, and/or other types of movements. Existing physics-based character tools generally provide for only indirect control of a character, making integration with traditional animation tools difficult. Further, such tools often use motion capture data as input. Generally, motion capture data is not sufficient for autonomous character control, as motion sequences provide only predefined responses and do not allow characters to respond to uncertain conditions. Additionally, there may be a need to update animation or provide different robotic devices different animation or movement skills and conventional techniques are time intensive requiring much iteration and training before deployment.

BRIEF SUMMARY

A computer implemented method includes training an encoder to generate latent representations of kinematic motion from motion data and training a control policy to generate dynamics informed output for a robotic system based on the latent representations of kinematic motion. The method further includes deploying the encoder and the control policy in the robotic system to generate the dynamics informed output based on the motion data.

In some examples, the motion data comprises a plurality of motion clips representing skills of a character.

In some examples, the encoder is trained as part of a variational autoencoder.

In some examples, the control policy is trained using reinforcement learning.

In some examples, the dynamics informed output includes one or more commands for actuators of an autonomous robot.

In some examples, the latent representations of kinematic motion are spatio-temporal embeddings of the motion data.

In some examples, the motion data is generated from animation input.

One or more non-transitory computer readable media are encoded with instructions which, when executed by one or more processors, cause the one or more processors to receive artist-specified kinematic input, generate a latent representation of the artist-specified kinematic input using an encoder, and generate dynamics informed output for a robotic system based on the latent representation and using a control policy.

In some examples, the artist-specified kinematic input is a motion clip associated with the character.

In some examples, dynamics informed output includes one or more commands for actuators of an autonomous robot.

In some examples, the latent representation is a spatio-temporal embedding of the artist-specified kinematic input.

In some examples, the dynamics informed output is further generated by the control policy based on a current state of an environment, where the dynamics informed output causes a character to take an action within the environment.

In some examples, the artist-specified kinematic input is not physics aware and the dynamics informed output is physics aware.

In some examples, the artist-specified kinematic input includes a spatial composition of at least a first motion of a first body part of a character and a second motion of a second body part of a character.

A character control system includes an encoder configured to generate latent representations of kinematic motion from motion data and a control policy configured to generate dynamics informed output for a robotic system based on the latent representations and a current state of a character.

In some examples, the motion data is generated from animation input.

In some examples, the motion data includes one or more motion clips of the character.

In some examples, the dynamics informed output includes one or more commands for actuators of an autonomous robot of the robotic system.

In some examples, the control policy is further configured to generate additional dynamics informed output for the robotic system based on second latent representations of second kinematic motion.

In some examples, the motion data is not physics aware and the dynamics informed output is physics aware.

DETAILED DESCRIPTION

Figure 1:
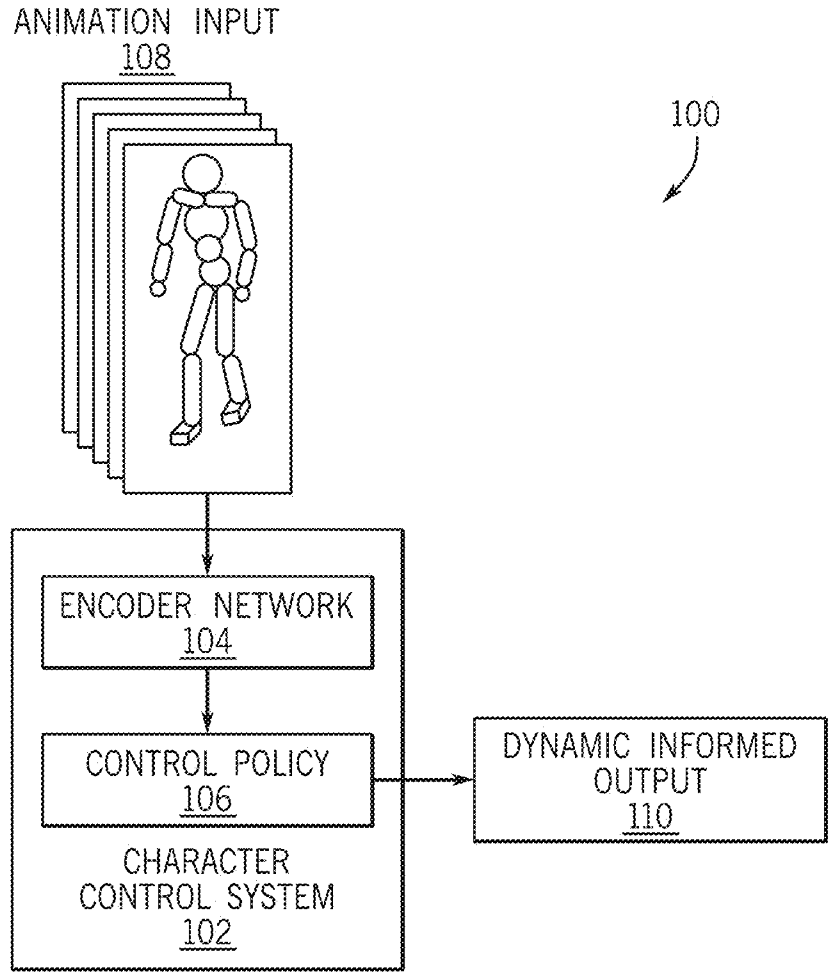
FIG. 1 illustrates an example character control system.

The systems and methods described herein may be utilized to provide physics-based or robotic character control based on artist-specified animation input. For example, physics-based character control may be utilized to provide robots able to imitate artist-specified motions while observing the laws of physics such that the robot remains dynamically stable while maintaining stylistic and other characteristics provided by an artist. Further, autonomous characters controlled by the character control system are able to respond to uncertain environments or interactions. In some examples, the systems and methods described herein may be similarly utilized to generate physically accurate animations.

A character control system provides dynamic output based on artist provided animation input to the character control system. For example, an artist may provide an animated sequence to be emulated by an autonomous robot. The character control system may generally provide dynamics informed output, such as commands for actuators of the robot, allowing the robot to emulate the animated sequence in a way that allows the robot to remain physically stable (e.g., obey the laws of physics). For example, animated sequences may include skills (e.g., jumps, turns, running motions) which are not physically possible for autonomous robots. The character control system allows robots to perform such skills physically, while preserving artistic and stylistic intent provided in the artist provided animated input. Additionally, various skills can be learned and readily deployed in new combinations of animated sequences or inputs.

Character control systems described herein generally utilize an encoder generating latent representations of artist provided animation input and a control policy generating dynamics informed output by determining a next state for the environment based on the latent representations generated by the encoder. The encoder and control policy are generally trained using a two-step process. The encoder is generally trained as part of a variational autoencoder, using artist-created or motion captured datasets representing general-purpose and/or universal skills representing the motion skills and style of a physics-based character as input. The control policy is then trained using reinforcement learning to generate next actions for a character based on the generated latent representations and a current state of the character. Because the encoder is trained using such universal motion skills for a character, the character control system described herein may utilize a single control policy without the need to generate additional control policies or to further train the control policy for different types of motions. Because the control policy does not need to be trained for new animation sequences or types of motions, new sequences may be quickly and efficiently deployed to robots or other characters. Further, the control policy is trained efficiently, while still preserving high-fidelity and control of a character.

The character control system disclosed herein also allows spatial and temporal compositing of motions for autonomous characters. Latent representations of the motion generated may be mapped to a latent space and may be close within the latent space when the motions are temporally or spatially close to one another. Accordingly, a trained policy may sample multiple motions from a latent space and blend such motions together. For example, spatial compositing may combine multiple motion clips into dynamics informed output, such as combining a running motion with an arm waving sequence. Spatial compositing may combine multiple temporally close motion clips into one motion clip to generate dynamics informed output. Such spatial and temporal compositions generally allow for an autonomous character to respond to changes in the environment with stylistically accurate, dynamically stable, and smooth motions.

In various examples, in addition to emulating animated sequences, the character control system may allow autonomous robots to interact with the environment and/or respond to changes in the environment. In such examples, the generated latent space may include latent representations of a wide variety of skills for a particular character. For example, a trained control policy may generate a next action for a character based on both kinematic motion input and a current state of the character. Accordingly, when the state of the character changes due to changes in the environment, the policy may output a next action for the autonomous robot that is both stylistically close to the intended kinematic motion input and compensates for or responds to changes in the environment. For example, if an autonomous robot is bumped or presented with an unexpected obstacle (e.g., an item on the ground), the policy may generate a next action compensating for the unexpected condition to keep the robot dynamically stable before returning to intended motion input. In another example, if other types of input are provided to the autonomous robot to allow for interaction with the robot (e.g., speech or other audio input, gestures or other visual input, and the like), the policy may generate a next action to respond to such input in a manner that is both physically feasible (e.g., allows the robot to remain dynamically stable) and stylistically accurate for the character by sampling the latent space.

Turning to the drawings, FIG. 1 illustrates an example character control system 102. The character control system 102 generally receives animation input 108 and generates dynamics informed output 110 using a trained encoder network 104 and a trained control policy 106. The dynamics informed output 110 may generally be utilized to generate physically accurate character motions. For example, the dynamics informed output 110 may include commands for actuators of an autonomous robot or physically accurate animations.

In various examples, animation input 108 may be provided by an artist through an interface to the character control system 102. For example, artists may provide motion sequences for a character to the character control system 102, where the motion sequences are created using conventional animation tools and software. Other types of artist input may be provided to the character control system 102 via an interface to the character control system 102. For example, an artist may spatially compose motions of different body parts of a character and provide the spatially composed motions to the character control system 102 as animation input 108. Other types of animation input 108 may include, for example, sequenced motion clips. Generally, the animation input 108 provided to the character control system 108 is not physics aware. That is, the input may include motions or skills that would not be physically possible for a robot or other physics-based character.

The animation input 108 may generally be provided to the encoder 104 of the network, which is trained to generate latent representations of motion frames or motion clips for a character. The encoder 104 may generally be trained as part of a variational autoencoder using a dataset of motion frames representing different skills (e.g., walking sequences, arm movements, running sequences, turns, and other movement skills). In various examples, such latent representations may be spatio-temporal embeddings. That is, the embeddings may generalize along both a temporal and spatial axis, such that motion frames that are spatially similar are close to one another in the latent space and motion frames that are temporally close to one another are close to one another in the latent space. The encoder 104 may generate a latent space of such spatio-temporal embeddings which may be sampled by the control policy to generate dynamics informed output.

The control policy 106 is generally trained to generate a next action for a character based on a motion frame and corresponding latent embedding. The next action may further be generated based on a current state of the character. For example, the control policy may generate next actions to allow a character to emulate animation input 108 in a physically feasible way, that is, the animation input 108 may be emulated by a robot in a manner that allows the robot to remain dynamically stable. The control policy may also generate next actions to compensate for changing conditions in the environment, such as unexpected objects in the environment, bumps or other changes to the dynamics of the robot within the environment, interactions with the robot, and the like.

In various examples, the character control system 102 may include or utilize one or more hosts or combinations of compute resources which may be located, for example, at one or more servers, cloud computing platforms, computing clusters, and the like. Generally, the character control system 102 is implemented by compute resources including hardware for memory and one or more processors. For example, the character control system 102 may utilize or include one or more processors, such as a CPU, GPU, and/or programmable or configurable logic.

In some embodiments, various components of the character control system 102 may be distributed across various computing resources, such that the components of the character control system 102 communicate with one another through a network and/or other communications protocols. For example, one or more components of the character control system 102 may be implemented as a serverless service, where computing resources for various components of the character control system 102 may be located across various computing environments (e.g., cloud platforms) and may be reallocated dynamically and/or automatically according to, for example, resource usage of the character control system 102. In various implementations, the character control system 102 may be implemented using organizational processing constructs such as functions implemented by worker elements allocated with compute resources, containers, virtual machines, and the like.

In various examples, the components shown in FIG. 1 may communicate over various networks using wired and/or wireless communications protocols. For example, the character control system 102 may be remote from an autonomous robot and may communicate with the autonomous robot using one or more wireless communication protocols. In some examples, the character control system 102 may communicate with autonomous robots, other characters, or the like via wired communication protocols. The character control system 102 may include one or several components integrated into or local to an autonomous robot or other character.

Figure 2A:
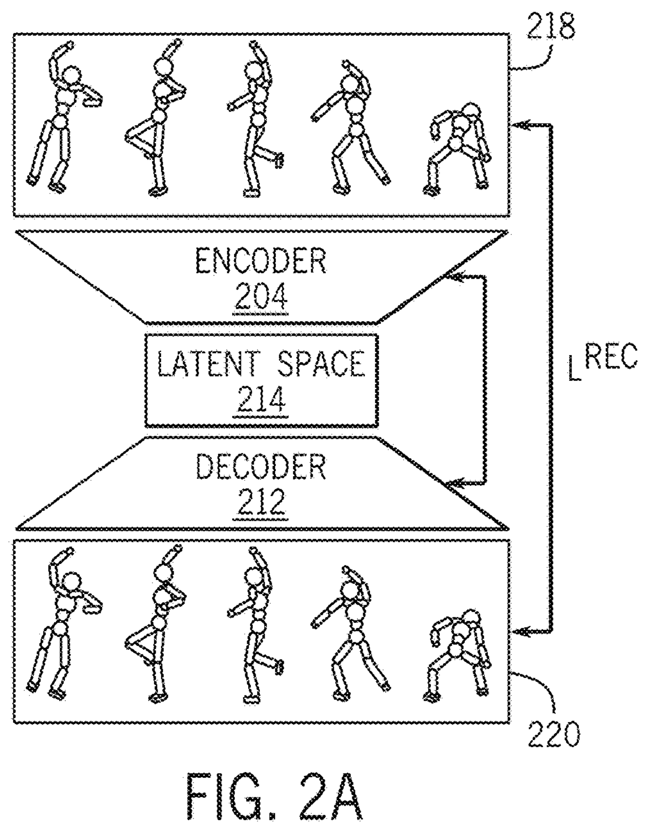
FIG. 2A illustrates a schematic diagram of an example architecture for training an encoder for use in a character control system.

FIG. 2A illustrates a schematic diagram of an example architecture for training an encoder 204 for use in a character control system. The encoder 204 may be part of a variational autoencoder including both the encoder 204 and the decoder 212. The variational autoencoder is generally trained to imitate motions from a kinematic motion dataset. For example, the encoder 204 is trained to generate latent representations of the motions, while the decoder 212 is trained to reconstruct the motions using the latent representations generated by the encoder 204.

During training, the encoder 204 may be provided with motion clips (e.g., motion clip 218) from an unstructured motion dataset. The motion clips may generally be representative of the universal skills of a human, virtual character, or robot. Generally, for each motion clip, a kinematic state, including positions and velocities, is extracted for a center frame and a number of frames surrounding the center frame. Utilizing a center frame and frames surrounding the center frame provides knowledge about what a character will do in the near future along with what the character has done in the near past. For example, velocities can change quickly due to factors such as impact. For skills such as jumping, it is important to capture context beyond a current frame. Use of motion clips generally provides such context.

The motion clips may be expressed as normalized or time-shifted motion windows. For example, the unstructured motion dataset may include a number of distinct motion clips, which may be finite sequences of character poses and velocities. Each frame of a motion clip may be represented by a vector {x, θ, v, q, q'}, where x is the 3-dimensional position of the root expressed in global coordinates, θ is the orientation of the root expressed as a 6 dimensional vector, v is the root twist, q represents joint positions, and q' represents joint velocities. The input vector may be augmented by adding a selection of key positions p on the body of the character to form input motion $m_t$={x, θ, v, q, q', p} and a motion window m={$m_{t-W}$, . . . , $m_{t+W}$}, where $m_t$ are motion windows at time t and m is a motion window of length 2W+1. The motion window m is normalized by expressing the motion window in a local heading frame extracted from the middle root pose. By normalizing the motion window in such a manner, the normalized motion window $\overline{m}$ is invariant to global translation and heading direction.

The encoder 204 generally maps the provided motion windows to a distribution of latents $z_t \in \mathbb{R}^d$ (e.g., the latent space 214) modeled as a multivariate Gaussian distribution. The decoder 212 is generally trained to map sampled latent representations back to the input space. The reconstructed output may then be compared to the initial input to the encoder. For example, the variational autoeconder may be trained using a reconstruction loss function $$\mathcal{L}^{rec}(M_t, M_t') = \frac{1}{2W+1} \Sigma_{i=t-W}^{t+W} \ell^{rec}(m_i, m_i')$$

and a weighted KL-divergence loss with a standard Gaussian distribution prior as the latent distribution. For individual frames, the loss on standard normalized quantities may be computed by first computing rotation matrices using the Gram-Schmidt process $$\ell^{rec}(m_i, m_i') = \|h_i - h_i'\|_2^2 + \|R(\theta_i) - R(\theta_i')\|_F^2 + \|v_i - v_i'\|_2^2 + \|q_i - q_i'\|_2^2 + \|\dot{q}_i - \dot{q}_i'\|_2^2 + \|p_i - vp_i'\|_2^2.$$

Figure 2B:
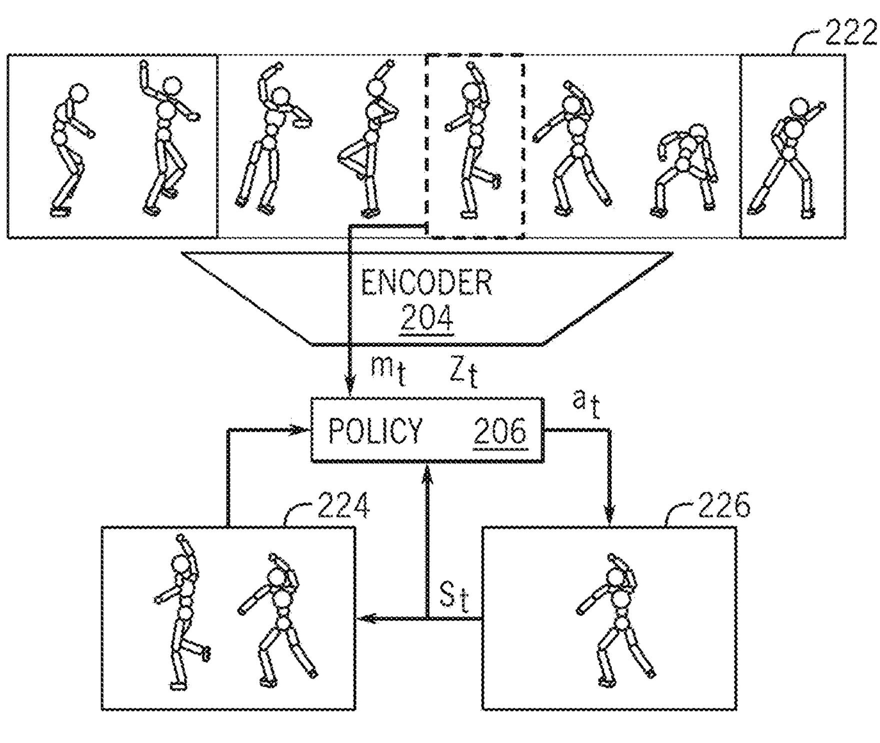
FIG. 2B illustrates a schematic diagram of an example architecture for training a control policy for use in a character control system.

FIG. 2B illustrates a schematic diagram of an example architecture for training a control policy 206 for use in a character control system 202. Generally, the control policy 206 may, using the architecture shown in FIG. 2B, be trained using a reinforcement learning framework to generate dynamics informed output based on latent representations of motion generated by an encoder 204. Specifically, the control policy 206 may be trained to generate dynamics informed output based on provided motion data.

In some examples, before training the control policy 206 and after training the encoder 204, each of the motion windows in the dataset may be encoded using the encoder 204, such that each frame $m_t$ is associated with a latent code $z_t$. At the beginnings and ends of motion clips, the start and end frames may be repeated to initialize complete windows. Because the clip is encoded with a series of latent codes, similarities can be identified at a fine-grained level, allowing for precise control.

The control policy 206 is generally a network trained using reinforcement learning, where the agent interacts with the environment and maximizes the expected discounted return. At each time step, the agent produces an action $a_t$ within the environment 226 according to the stochastic policy $\pi(a_t|s_t,c_t)$, where $c_t$ is the conditional input to the policy, and $s_t$ is the observed state at time t. After being provided with the action, the environment produces the next state $s_{t+1}$ and a scalar reward 224 $r_t=r(s_t,a_t,s_{t+1},c_t)$. The control policy 206 is generally trained to produce a next state within an environment that maximizes the scalar reward.

The control policy 206 is generally conditioned on both the time varying latent code $z_t$ and the instantaneous motion reference $m_t$ corresponding to the time varying latent code, such that the conditioning input may be expressed as $c_t=(m_t,z_t)$. In some examples, the motion reference $m_t$ may be normalized using the same process used to normalize the motion windows, with W=0. Generally, conditioning the control policy 206 on both the instantaneous motion reference and the time varying latent code improves the performance of the control policy, as the motion reference provides instantaneous feedback while the latent code helps the control policy 206 to bring the current target in alignment with similar motions as the latent code contains information about the intermediate past and future.

To train the control policy 206, in some examples, an episode of fixed length Tis initialized by randomly choosing a frame from the dataset and retrieving the pair $(m_t,z_t)$ corresponding to the frame. A next pair may be retrieved for the next frame within the motion clip, with the process being continued until the end of the clip. Such randomized initialization may lead to increased learning efficiency.

The reward 224 provided during training may generally include a combination of motion tracking, staying alive, and regularization terms. For example, the reward 224 may be expressed as $$r_t = r_t^{track} + r_t^{alive} + r_t^{smooth}.$$

In some examples, rewards may be computed between the reference $m_t$ and a simulated pose of the character. For example, the motion tracking term of the reward may be calculated as $$r_t^{track} = -c^h\left\|h_t - \hat{h}_t\right\|_2^2 - c^\theta\left\|R(\theta)_t - R(\hat{\theta}_t)\right\|_F^2 -$$

-continued $$c^v\|v_t - \hat{v}_t\|_2^2 - c^q\|q_t - \hat{q}_t\|_2^2 - c^{\dot{q}}\left\|\dot{q}_t - \hat{\dot{q}}_t\right\|_2^2 - c^p\|p_t - \hat{p}_t\|_2^2,$$

where quantities with a hat are observations from the simulated motion state. The survival term of the reward generally provides an objective motivating the character to stay alive and prevent early termination at the beginning of training, and may be expressed, in various examples, as $$r_t^{alive} = c^{alive}.$$

The regularization term may generally mitigate vibrations and avoid unnecessary actions. In various examples, the regularization term may apply a first and second-order action rate penalty, and penalize joint torque $\tau$. For example, the regularization term may be expressed as $$r_t^{smooth} = -c^{\Delta a}\|a_t - a_{t-1}\|_2^2 - c^{\Delta^2 a}\|a_t - 2a_{t-1} + a_{t-2}\|_2^2 - c^\tau\|\tau\|_2^2.$$

The smoothness weights in the regularization term may trade off tracking accuracy against the suppression of sliding or vibration artifacts.

In various examples, domain randomization may be used to increase the robustness of the policy and to avoid overfitting to a single set of simulation parameters. The mass of each rigid body may be randomized by a percentage error $\in_m$. Random pushes may be performed on the root, head, hands, and feet of the character. The frictional coefficient of the ground may be randomized to prevent the policy from exploiting a particular coefficient through foot sliding or vibrations.

Figure 3:
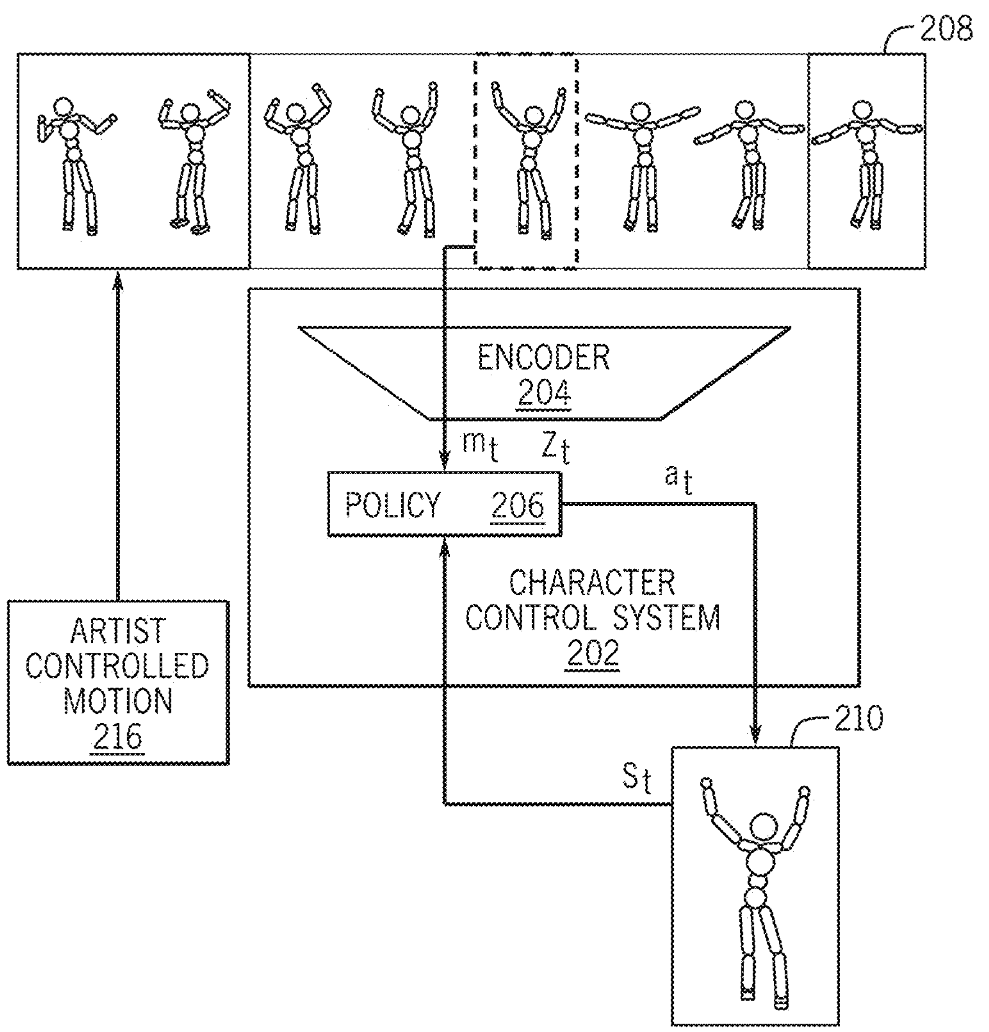
FIG. 3 illustrates a schematic diagram of an example trained motion policy used to generate dynamics informed output.

FIG. 3 illustrates a schematic diagram of an example trained motion policy 206 used to generate dynamics informed output 210. As shown, the character control system 202 may receive artist-controlled motion 216 and artist-specified animation input 208 and utilize a trained encoder 204 and the trained control policy 206 to generate the dynamics informed output 210. For example, when provided with artist-controlled motion 216, the encoder 204 may generate a latent representation of artist-specified animation input 208 generated from the artist controlled motion 216. The control policy 206 may then generate dynamics informed output 210 based on the generated latent representation and/or additional latent representations of motions in the latent space generated during training of the encoder 204.

In various examples, the artist-specified animation input 208 may include spatial composition, motion editing, and/or artist-created motion. For example, artists may control the character by spatially composing motions of different body parts. For example, arm motions of a character may be sourced from one clip while body motions of a character may be sourced from another clip. In some examples, artists may sequence full or partial motion clips in an arbitrary order to create an initial reference animation for a character (e.g., animation 208). The artist may generally edit the motion reference to, for example, time key events at key locations. Artist-controlled motion 216 may further be provided by artists using standard animation tools (e.g., software) and workflows that are not physics aware. For example, an artist may provide motion sequences for characters utilizing standard animation tools. Because standard animation tools are used, new animation sequences can be quickly deployed to an autonomous robot.

As described with respect to FIG. 2A, the encoder 204 is generally trained to generate latent representations of motion clips from the artist-specified animation input 208. The artist-controlled motion 216 may provide motion clips 208 to be encoded by the encoder 204. The encoder 204 may, for each frame of a motion clip, associate each frame $m_t$ with a latent code $z_t$, such that a motion clip is generally associated with a series of latent codes forming the latent representation of the motion clip. The encoder 204 may further map newly generated latent representations into a spatio-temporal latent space generated during training of the encoder 204.

The control policy 206 is generally trained to generate a next action $a_t$ for a character based on the latent representations and a state $s_t$ of the character. Dynamics informed output 210 may be generated based on the generated action for the character. Generally, the dynamics informed output 210 is physics aware. That is, the dynamics informed output causes motions that are physically possible (e.g., allow a robot to remain dynamically stable while performing the motions). In some examples, the next action for the character may be an action to emulate movement in the motion clip 208 in a physics aware manner—the next action and the associated dynamics input may be generated such that movement of a robot or character remains as close as possible to the motion provided as input while obeying the laws of physics.

In some examples, the next action may further be generated to respond to conditions in the environment while maintaining a stylistic input and/or imitating movement in the motion clip 208. For example, the next action may cause a robot to compensate for an unexpected bump or obstacle in the environment before returning to imitating movement in the motion clip. In other examples, the next action may cause the robot to respond to other conditions in the environment, such as interactions with the robot (e.g., speech or visual commands or input). In such examples, the control policy 206 may sample the latent space generated by the encoder 204 to identify a next action for the character which maintains the stylistic intent of the character.

Figure 4:
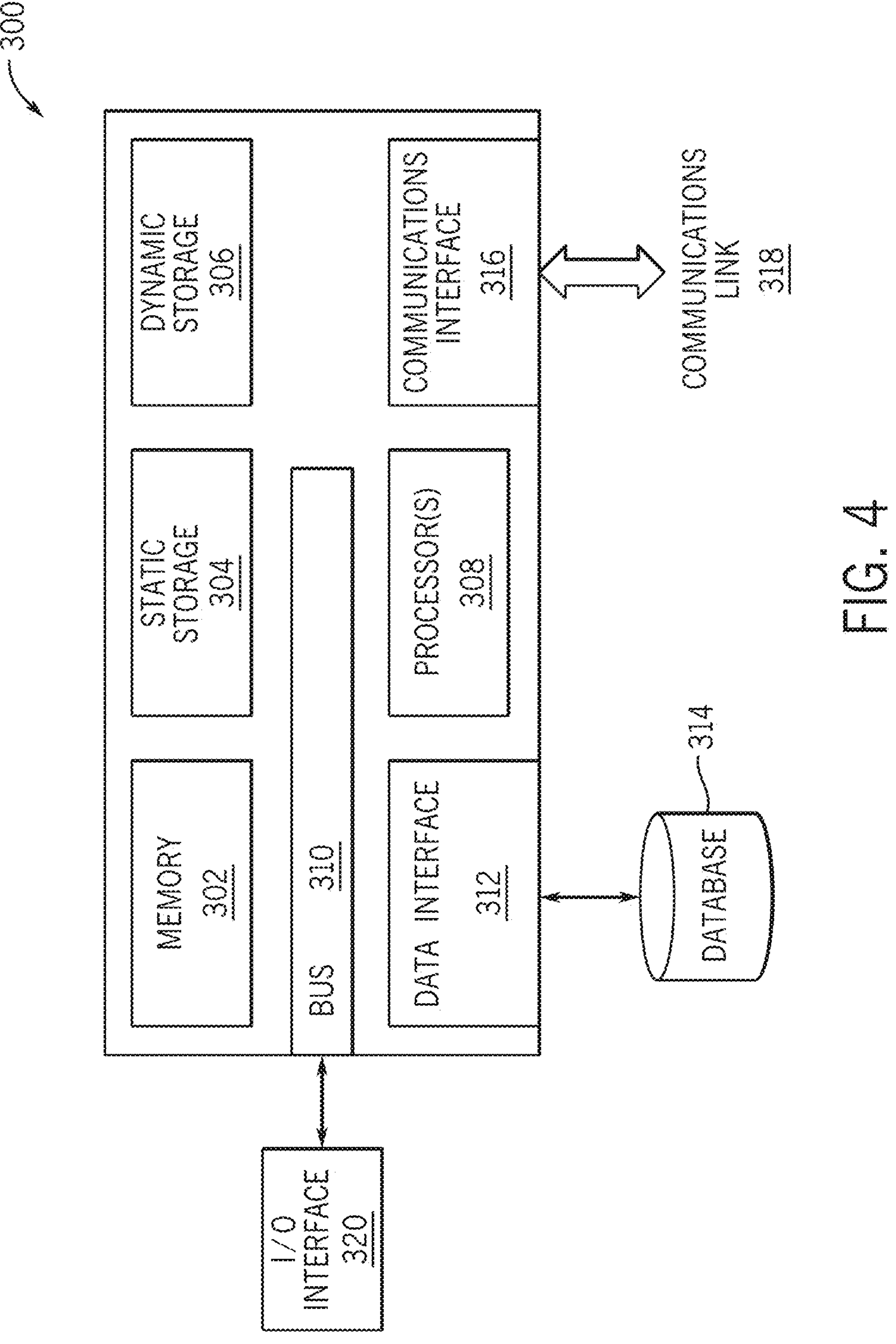
FIG. 4 is an example computing system used in various examples of the disclosure.

FIG. 4 illustrates an example computing system 300 that may be used for implementing various embodiments in the examples described herein. For example, in various embodiments, components of the character control system 102 and the character control system 202 may be implemented by one or several computing systems 300. For example, the encoder network 104 and/or the control policy 106 may include or be implemented by a computing system 300. The encoder network 104 and/or the control policy 106 may further be trained or generated using a computing system 300. This disclosure contemplates any suitable number of computing systems 300. For example, the computing system 300 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 300 may include one or more computing systems; be unitary or distributed; span multiple locations; span multiple machines; span multiple data centers; or reside in a cloud, which may include one or more cloud components in one or more networks.

Computing system 300 includes a bus 310 (e.g., an address bus and a data bus) or other communication mechanism for communicating information, which interconnects subsystems and devices, such as processor 308, memory 302 (e.g., RAM), static storage 304 (e.g., ROM), dynamic storage 306 (e.g., magnetic or optical), communications interface 316 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 320 (e.g., keyboard, keypad, mouse, microphone). In particular embodiments, the computing system 300 may include one or more of any such components.

In particular embodiments, processor 308 includes hardware for executing instructions, such as those making up a computer program. For example, a processor 308 may execute instructions for various components of a character control system. The processor 308 circuitry includes circuitry for performing various processing functions, such as executing specific software for performing specific calculations or tasks. In particular embodiments, I/O interface 320 includes hardware, software, or both, providing one or more interfaces for communication between computing system 300 and one or more I/O devices. Computing system 300 may include one or more of these I/O devices, where appropriate. One or more of these I/O devices may enable communication between a person and computing system 300.

In particular embodiments, the communications interface 316 includes hardware, software, or both providing one or more interfaces for communication (such as, for example, packet-based communication) between computing system 300 and one or more other computer systems or one or more networks. One or more memory buses (which may each include an address bus and a data bus) may couple processor 308 to memory 302. Bus 310 may include one or more memory buses, as described below. In particular embodiments, one or more memory management units (MMUs) reside between processor 308 and memory 302 and facilitate accesses to memory 302 requested by processor 308. In particular embodiments, bus 310 includes hardware, software, or both coupling components of computing system 300 to each other.

According to particular embodiments, computing system 300 performs specific operations by processor 308 executing one or more sequences of one or more instructions contained in memory 302. For example, instructions for various components of the character control system 102 and the character control system 202 may be contained in memory 302 and may be executed by the processor 308. Such instructions may be read into memory 302 from another computer readable/usable medium, such as static storage 304 or dynamic storage 306. In alternative embodiments, hard-wired circuitry may be used in place of or in combination with software instructions. Thus, particular embodiments are not limited to any specific combination of hardware circuitry and/or software. In various embodiments, the term “logic” means any combination of software or hardware that is used to implement all or part of particular embodiments disclosed herein.

The term “computer readable medium” or “computer usable medium” as used herein refers to any medium that participates in providing instructions to processor 308 for execution. Such a medium may take many forms, including but not limited to, nonvolatile media and volatile media. Non-volatile media includes, for example, optical or magnetic disks, such as static storage 304 or dynamic storage 306. Volatile media includes dynamic memory, such as memory 302.

Computing system 300 may transmit and receive messages, data, and instructions, including program, e.g., application code, through communications link 318 and communications interface 316. Received program code may be executed by processor 308 as it is received, and/or stored in static storage 304 or dynamic storage 306, or other storage for later execution. A database 314 may be used to store data accessible by the computing system 300 by way of data interface 312. For example, projection settings and predetermined positions of ride vehicles may be stored using a database 314. In various examples, a communications link 318 at the character control system 202 may communicate with systems providing artist-controlled motion 216, systems receiving dynamics informed output 210, and/or computing components within a network.

Figure 5:
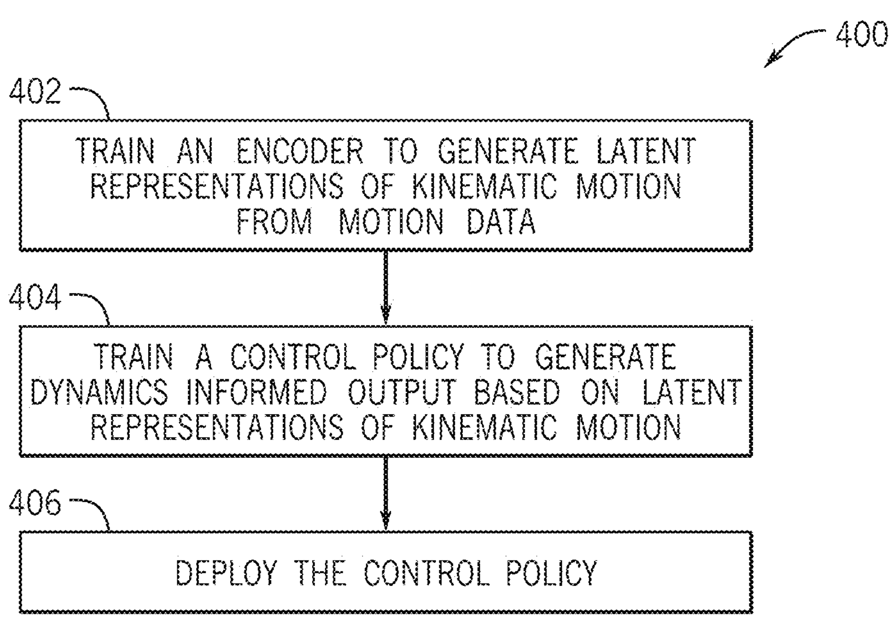
FIG. 5 is a flow chart illustrating an example process for training a control policy for generating dynamics informed output based on artist input.

FIG. 5 illustrates a process 400 for training a control policy for generating dynamics informed output based on artist input. The process 400 is generally a two-stage process, separating the extraction of a latent space (e.g., training the encoder 204) from the training of the control policy 206. The two-stage training process reduces or eliminates mode collapse. Further, separating the motion encoding from the policy training generally results in a structured latent space that improves dataset coverage and imitation quality when compared to a policy that is directly driven by reference motion.

At block 402, an encoder is trained to generate latent representations of kinematic motion from motion data associated with a character. The encoder (e.g., encoder 204) is generally part of a variational autoencoder including both the encoder and a decoder (e.g., decoder 212). Generally, the variational autoencoder is trained to imitate motions from a kinematic motion dataset. That is, the encoder is trained to generate latent representations of motions in the kinematic motion dataset, while the decoder is trained to reconstruct the motions from the latent representations. Through the training of the variational autoencoder, the encoder 204 is trained to generate the latent representations and generates a latent space from the latent representations.

The encoder 204 may generally be provided with motion clips in the kinematic motion dataset. A kinematic state may be extracted for a number of frames of a motion clip (e.g., a center frame and surrounding frames), where the kinematic state includes terms for positions and orientations of the character within the motion frame. A motion window may be generated based on the kinematic states of the frames within a motion clip. In some examples, the motion window may be normalized prior to providing a normalized motion window to the encoder 204.

When provided with a motion window, the encoder 204 generally maps the motion window to a latent distribution modeled as a multivariate Gaussian distribution. The decoder 212 may then reconstruct the latent representations to the input space. The reconstructed representations may be compared to the initial input to the encoder. Over time, through training of the variational autoencoder, the latent representations become more robust. After training, the latent space may be utilized to map latent representations along both a temporal and spatial axis. That is, motion windows that are spatially similar may be close to one another along the spatial axis of the latent space. Similarly, motion windows that are temporally close to one another are close to one another along the temporal axis of the latent space.

In various examples, after training of the encoder 204, each of the motion windows in the dataset may be encoded using the trained encoder 204, such that each frame of the motion windows in the dataset is associated with a latent code.

A control policy 206 is trained to generate dynamics informed output 210 based on latent representations of kinematic motion at block 404. The control policy 206 is generally a network trained using reinforcement learning, where an agent interacts with the environment to maximize an expected return. During training, the control policy 206 produces an action in an environment using a stochastic policy based on a conditional input and an observed state of the environment at a time. After being provided with the action, the environment moves to a next state and a scalar reward is generated based on the next state. The scalar reward may be based on motion tracking, staying alive, and regularization, where the scalar reward is maximized by maximizing the tracking, alive, and regularization terms.

At block 406, the control policy 206 is deployed. Deploying the control policy may generally include providing the control policy 206 to a character control system 202. In various examples, the character control system 202 includes the trained encoder 204 and the trained control policy 206. The character control system 202 generally generates dynamics informed output based on artist provided input. When trained, the control policy 206 generates the dynamics informed output based on latent representations of kinematic motion generated by the trained encoder 204. In various examples, the character control system 202 may be executed by processing resources local to an autonomous or other robot. In some examples, the character control system 202 may be located remote from a robot and the robot may communicate with the character control system 202 via one or more wireless protocols, network connections, or the like.

Figure 6:
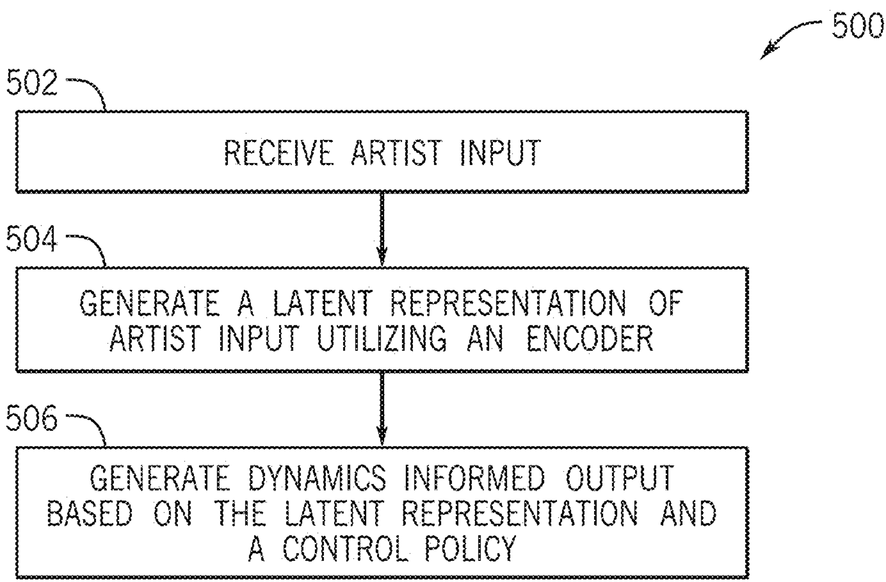
FIG. 6 is a flow chart illustrating an example process for generating dynamics informed output based on artist input using a character control system.

FIG. 6 illustrates a process 500 of generating dynamics informed output based on artist input using a character control system 202. Artist input is received at block 502. In various examples, artist input may be received via a user interface to the character control system 202. In some examples, artist input may include clips or movement sequences to be emulated by a robot. Artist input may further include spatial compositions for a character, sequences of full or partial motion clips, or other movement sequences for a character. In various examples, the artist input may be translated or encoded prior to generation of latent representations. For example, motion clips may be represented as motion windows, with each frame of the motion clip being represented by a vector representing a kinematic state in the motion frame, where the vector includes terms for positions and orientations of the character within the motion frame.

At block 504, a latent representation of artist input is generated using an encoder (e.g., encoder 204). A latent representation of a motion clip or motion sequence may be a series of latent codes, with each of the series of latent codes encoding a frame of the artist input. The latent code for each clip of the motion sequence may be mapped to a latent space generated during training of the encoder 204.

Dynamics informed output 210 is generated based on the latent representation and a control policy 206 at block 506. In various examples, the control policy 206 generates a next action for the character in the environment based on a current state of the character and a latent representation. The dynamics informed output 210 may then be generated based on the next action. In some examples, the next action may be generated to emulate movement in the artist input in a physics aware manner. In some examples, the next action may be generated to compensate for a change in the environment while emulating movement in the artist input. For example, where there is an unexpected push to a robot in the environment, the next action may stabilize the robot before the control policy 206 generates next actions to continue to emulate a motion sequence. In other examples, the next action may be generated to respond to some other input from an environment, such as input (e.g., audio or visual input) from users interacting with an autonomous robot. In such examples, the control policy 206 may sample from the latent space to generate a next action causing the robot to appropriately respond to the input from the environment in a style consistent with the character.

In various examples, the next action generated by the control policy 206 may be translated to dynamics informed output 210, which allows the character to take the generated next action. Generally, the state of the environment may be updated after the generated next action is taken, and the control system 206 may then generate additional actions based on the updated state.

In accordance with the above disclosure, a character control system is provided which provides physically accurate output for characters based on artist provided animation input. Accordingly, the character control system provides for direct control of characters by artists, allowing characters that need to obey the laws of physics (e.g., robotic characters) to maintain stylistic and other characteristics provided by an artist. The character control system further allows for autonomous characters controlled using the character control system to respond to uncertainties in an environment, respond to interactions, and take other autonomous actions while retaining stylistic characteristics and remaining dynamically stable.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms “a” and “an” are taken to mean “one”, “at least one” or “one or more”. Unless otherwise required by context, singular terms used herein shall include pluralities and plural terms shall include the singular.

Unless the context clearly requires otherwise, throughout the description and the claims, the words ‘comprise’, ‘comprising’, and the like are to be construed in an inclusive sense as opposed to an exclusive or exhaustive sense; that is to say, in the sense of “including, but not limited to”. Words using the singular or plural number also include the plural and singular number, respectively. Additionally, the words “herein,” “above,” and “below” and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A computer implemented method comprising:

training an encoder to generate latent representations of kinematic motion from motion data, wherein the motion data comprises one or more time-shifted motion windows;

training a control policy to generate dynamics informed output for a robotic system based on the latent representations of kinematic motion; and deploying the encoder and the control policy in the robotic system to generate the dynamics informed output based on the motion data.

2. The method of claim 1, wherein the motion data further comprises a plurality of motion clips representing skills of a character.

3. The method of claim 1, wherein the encoder is trained as part of a variational autoencoder.

4. The method of claim 1, wherein the control policy is trained using reinforcement learning.

5. The method of claim 1, wherein the dynamics informed output comprises one or more commands for one or more actuators of the robotic system.

6. The method of claim 1, wherein the latent representations of kinematic motion are spatio-temporal embeddings of the motion data.

7. The method of claim 1, wherein the motion data is generated from animation input.

8. One or more non-transitory computer readable media encoded with instructions which, when executed by one or more processors, cause the one or more processors to:

receive an artist-specified kinematic input comprising one or more time-shifted motion windows;

generate a latent representation of the artist-specified kinematic input using an encoder; and generate a dynamics informed output for a robotic system based on the latent representation and using a control policy.

9. The one or more non-transitory computer readable media of claim 8, wherein the artist-specified kinematic input further comprises a motion clip associated with a character.

10. The one or more non-transitory computer readable media of claim 8, wherein the dynamics informed output comprises one or more commands for one or more actuators of the robotic system.

11. The one or more non-transitory computer readable media of claim 8, wherein the latent representation is a spatio-temporal embedding of the artist-specified kinematic input.

12. The one or more non-transitory computer readable media of claim 8, wherein the dynamics informed output is further generated by the one or more processors using the control policy and based on a current state of an environment, wherein the dynamics informed output causes the robotic system to take an action within the environment.

13. The one or more non-transitory computer readable media of claim 8, wherein the artist-specified kinematic input is not physics aware, wherein the dynamics informed output is physics aware.

14. The one or more non-transitory computer readable media of claim 8, wherein the artist-specified kinematic input further comprises a spatial composition of at least a first motion of a first body part of a character and a second motion of a second body part of a character.

15. A character control system comprising:

a processing element;

an encoder configured to generate, via the processing element, latent representations of kinematic motion from motion data, wherein the motion data comprises one or more time-shifted motion windows; and a control policy configured to generate, via the processing element, a dynamics informed output for a robotic system based on the latent representations and a current state of a character represented by the robotic system, wherein the encoder and the control policy are deployed on the robotic system to generate the dynamics informed output based on the motion data.

16. The character control system of claim 15, wherein the encoder is further configured to generate the motion data, via the processing element, from animation input.

17. The character control system of claim 16, wherein the motion data further comprises one or more motion clips of the character.

18. The character control system of claim 15, wherein the dynamics informed output comprises one or more commands for one or more actuators of an autonomous robot of the robotic system.

19. The character control system of claim 15, wherein the control policy is further configured to generate, via the processing element, additional dynamics informed output for the robotic system based on second latent representations of second kinematic motion.

20. The character control system of claim 15, wherein the motion data is not physics aware, wherein the dynamics informed output is physics aware.

* * * * *